INVENTORS
CHARLES F. HOWARD &
RAYMOND J. SPIELER
BY Louis A. Kline
Elmer Wargo
THEIR ATTORNEYS INVENTORS
CHARLES F. HOWARD &
RAYMOND J. SPIELER
BY Louis A. Kline
Elmer Wargo
THEIR ATTORNEYS INVENTORS
CHARLES F. HOWARD &
RAYMOND J. SPIELER
BY Louis A. Kline
Elmer Wargo
THEIR ATTORNEYS INVENTORS
CHARLES F. HOWARD &
RAYMOND J. SPIELER
BY Louis A. Kline
Elmer Wargo
THEIR ATTORNEYS INVENTORS
CHARLES F. HOWARD &
RAYMOND J. SPIELER
BY Louis A. Hine
Elmer Wargo
THEIR ATTORNEYS INVENTORS
CHARLES F. HOWARD &
RAYMOND J. SPIELER
BY Louis A. Kline
Elmer Wargo
THEIR ATTORNEYS INVENTORS
CHARLES F. HOWARD &
RAYMOND J. SPIELER
BY Louis A. Kline
Elmer Wargo
THEIR ATTORNEYS INVENTORS
CHARLES F. HOWARD &
RAYMOND J. SPIELER
BY Louis A. Kline
Elmer J. Wargo
THEIR ATTORNEYS INVENTORS
CHARLES F. HOWARD &
RAYMOND J. SPIELER
BY Louis A. Kline
Elmer Wargo
THEIR ATTORNEYS

1

3,440,955

MULTIPLE PAPER-FEED MECHANISM AND STACKER DEVICE IN HIGH-SPEED PRINTERS

Charles F. Howard, Dayton, and Raymond J. Spieler, Centerville, Ohio, assignors to The National Cash Register Company, Dayton, Ohio, a corporation of Maryland Filed Sept. 29, 1966, Ser. No. 582,890
Int. Cl. B41j; B41k; B41l *45/00*
U.S. Cl. 101—93 10 Claims

ABSTRACT OF THE DISCLOSURE

A portable, selective, multiple paper-feed mechanism which is especially adaptable for use with a high-speed printer employing a rotating drum having printing characters thereon. The mechanism includes a paper-tape supply means, six individual tape feed stations, a stacking device for collecting the tapes after they are printed upon, and control means to control the feeding of the tapes at selected feed stations. Each feed station includes a drive roller and a shoe member having a flat smooth surface thereon. An individual tape, positioned between its associated roller and shoe member at its feed station, is fed by moving the shoe member towards the roller to squeeze the tape therebetween, and then the roller is incremently rotated to slide the tape over the smooth surface of the shoe member to incrementally feed the tape.

This invention relates to a paper-feed mechanism, and, more particularly, it relates to a portable, multiple, paper-feed mechanism which is especially adaptable to be detachably secured to a high-speed printer for use in data-processing applications.

In certain data-processing applications, it is desirable to extract data from a general account and record it in any one of several specific accounts, as is done in bank transit accounting and cost accounting, for example. The present invention is especially useful in such applications.

The present invention is a portable, selective, multiple paper-tape feed mechanism which is especially adaptable for use with a high-speed printer, such as a Class 400 printer manufactured by The National Cash Register Company, of Dayton, Ohio, United States of America. The invention generally includes a paper-tape supply means, six individual tape feed stations, tape guides, a stacking device for collecting the tapes after they are printed, and control means to control the feeding of the tapes at the selected feed stations. In the present embodiment, one or two paper feed stations may be operated simultaneously, but no more than two will be operated at any one time. The mechanism is readily, detachably secured to the printer, from which it obtains all its power requirements. The paper tapes are fed at rates up to approximately two thousand feed operations per minute.

The feeding of the paper tapes in prior-art, multiple, tape-lister systems is generally accomplished by having a separate printer designed specifically for the multiple-tape listing operations, whereas, in applicants' device, a multiple tape lister attachment is provided for use with a conventional high-speed printer. The attachment is conveniently detachably secured to the printer when multiple-tape listing is required and is removed therefrom when the high-speed printer is use conventionally. The cost of the attachment is considerably less than the cost of a separate printer designed specifically for multiple-tape listing operations.

The prior-art, multiple-tape, lister printers with which

2 applicants are familiar utilize sprocket driving wheels to feed the tapes, which are provided with complementary driving holes. In contrast, each tape used in applicants' device is non-perforated and is driven between a drive roller and a shoe, which are reciprocably mounted relative to each other. When the tape is to be fed, it is pressed between its respective drive roller and a flat smooth surface on its respective shoe, and the roller is intermittently rotated to slide the tape over the smooth surface. Tension is provided on the strip while it is being so fed, resulting in equally spaced lines of printing produced at a rapid rate. This type of attachment construction with its own separate feed mechanism provides for easy adaptability to a printer, as it does not interfere with the existing feeding mechanism of the printer itself.

The objects of this invention are:

(a) To provide a high-speed, paper-feed mechanism;

(b) To provide an economical, high-speed, multiple-tape, selective lister apparatus;

(c) To provide an economical, high-speed, multiple-tape, lister apparatus which is readily and detachably secured to a conventional high-speed printer; and (d) To provide an economical, high-speed, multiple-tape, lister attachment which is readily adaptable for use with the conventional, high-speed printer of the type employing a rotating drum with the printing characters thereon.

With these and incidental objects in view, the invention includes certain novel features of construction and combinations of parts, a preferred form or embodiment of which is hereinafter described with reference to the drawings which accompany and form a part of this specification.

Figure 5:
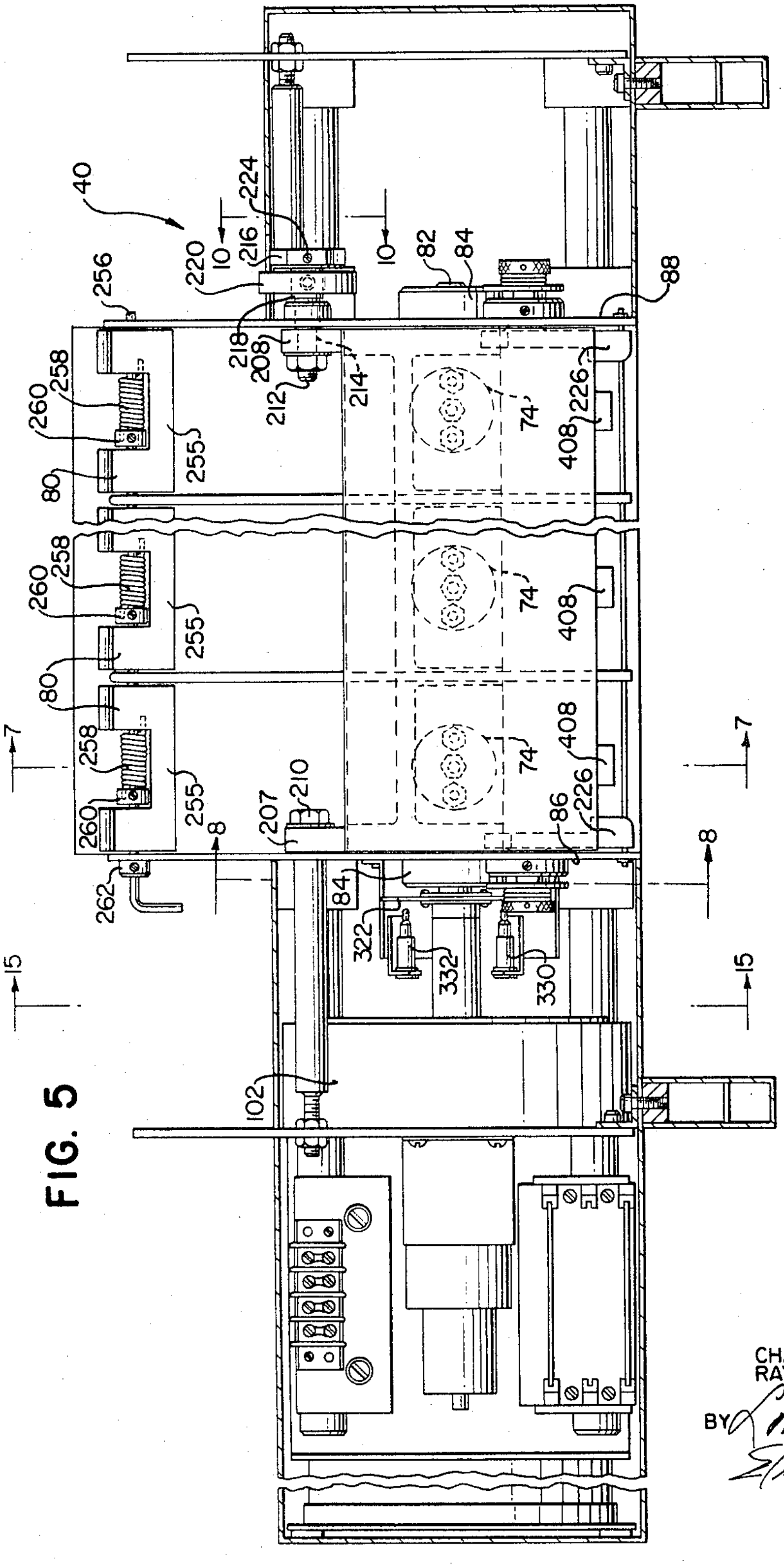
FIG. 5 is an enlarged plan view of the top of the feed mechanism of this invention, looking in the direction B of FIG. 1. Certain portions are broken away to facilitate illustration of the mechanism, and, as each station for feeding the individual strips of paper or tape is identical, only a few of such stations are shown.
Figure 15:
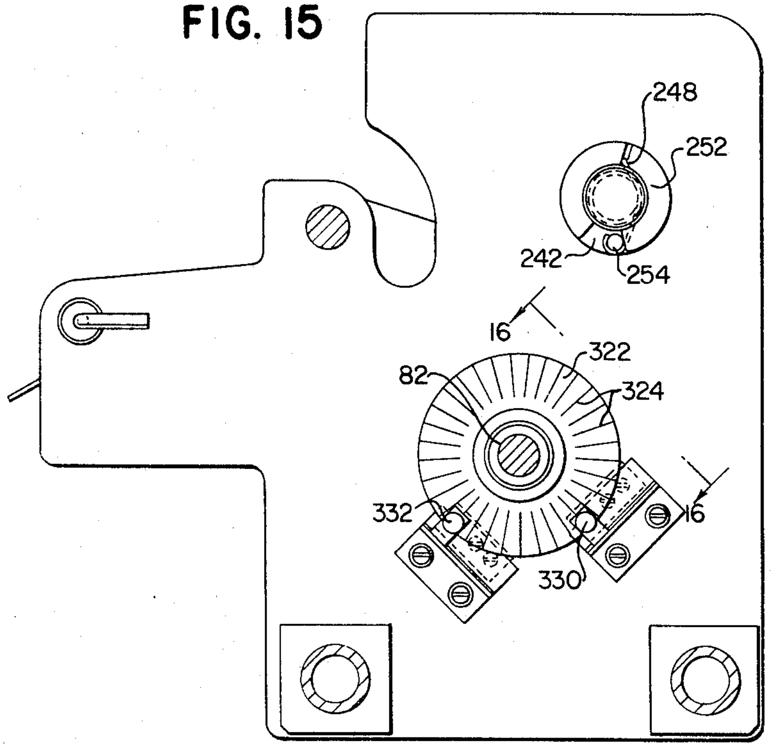
Figure 16:
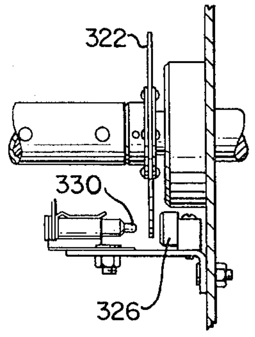
Figure 11:
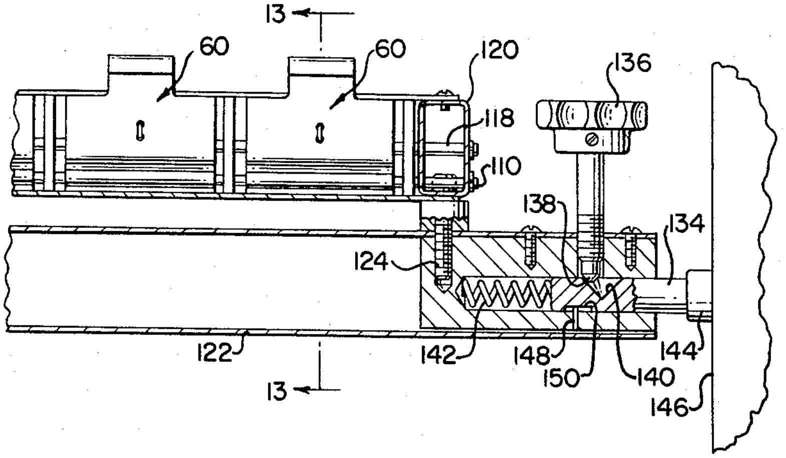
Figure 13:
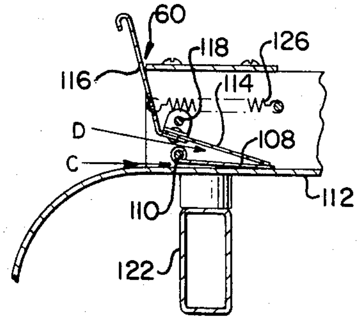
Figure 12:
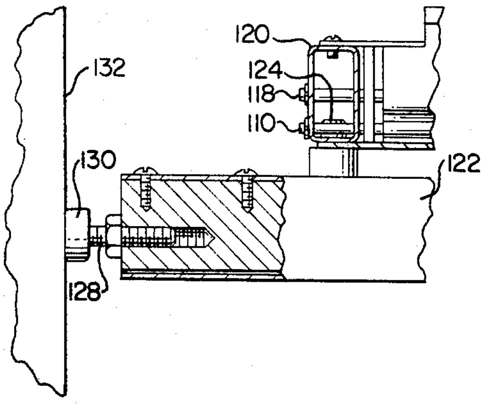
Figure 14:
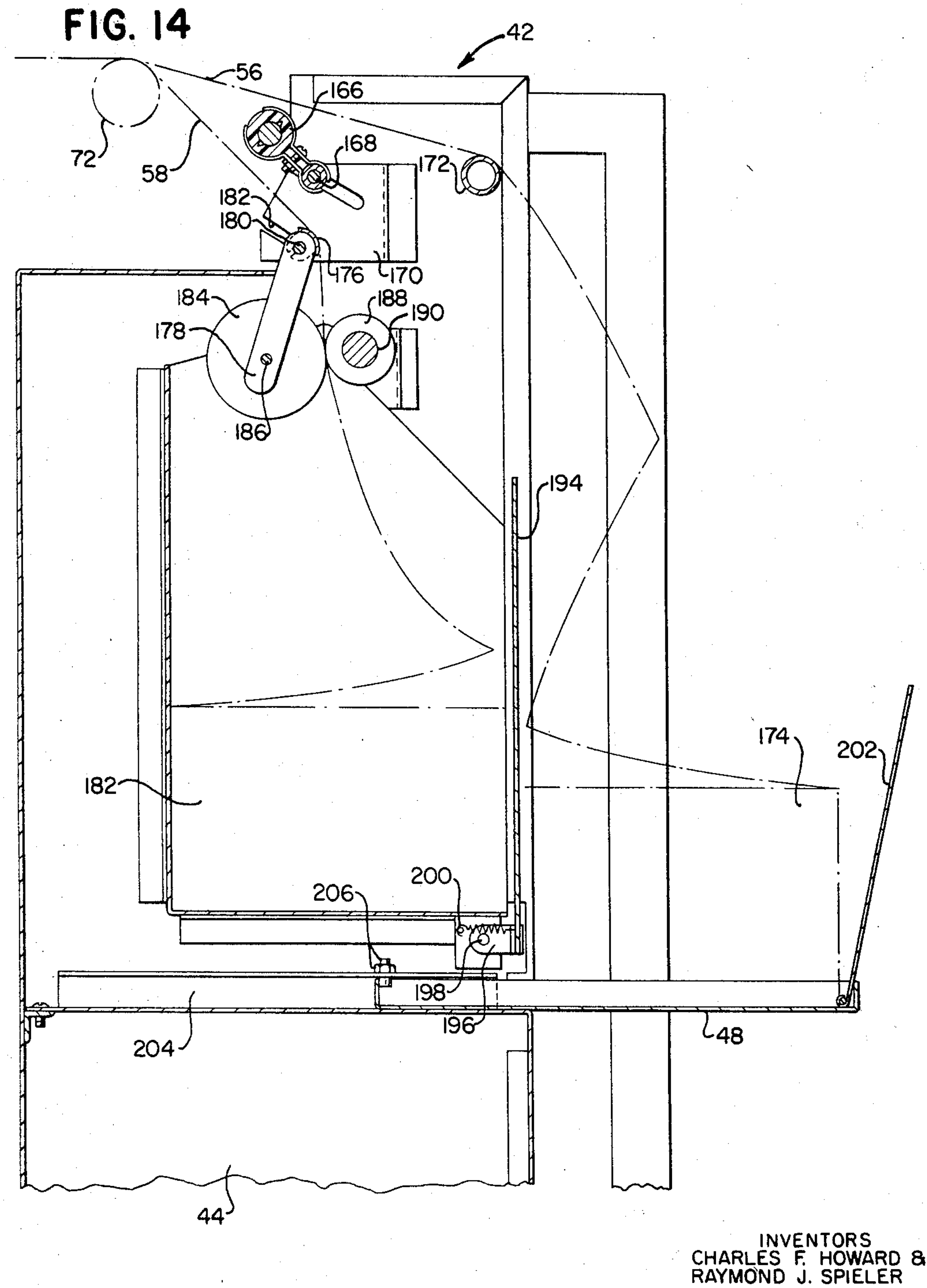
Figure 17:
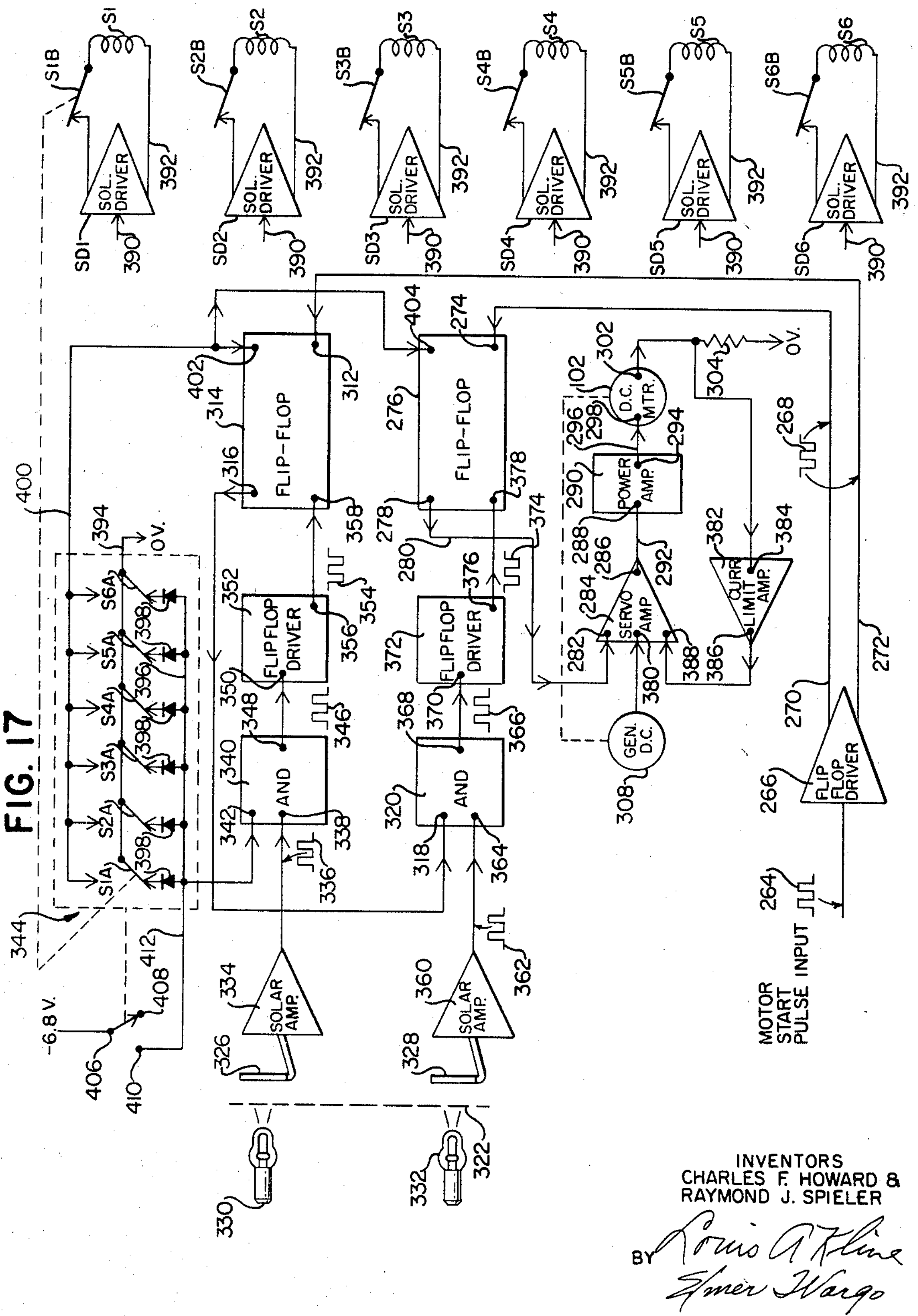

FIG. 11 is a partial view, in cross-section, of one half of the means for securing the paper supply means to the printer;

FIG. 12 is a view similar to FIG. 11 but showing the remaining half of the means for securing the paper supply means to the printer;

FIG. 13 is a cross-sectional view taken along the line 13—13 of FIG. 11, showing the means for placing drag on the paper forms entering the printer;

FIG. 14 is a cross-sectional view through one of the compartments in the paper receptacle, showing the means for refolding two-part forms;

FIG. 15 is a cross-sectional view taken along the line 15—15 of FIG. 5, showing the lamps, the light cells, and the slotted disc related to the feed mechanism;

FIG. 16 is a side view taken along the line 16—16 of FIG. 15, showing more details of the lamps, the light cells, and the slotted disc shown in FIG. 15; and FIG. 17 is a general schematic diagram, in block form, of the electronic circuitry used in the feed mechanism.

Figure 2:
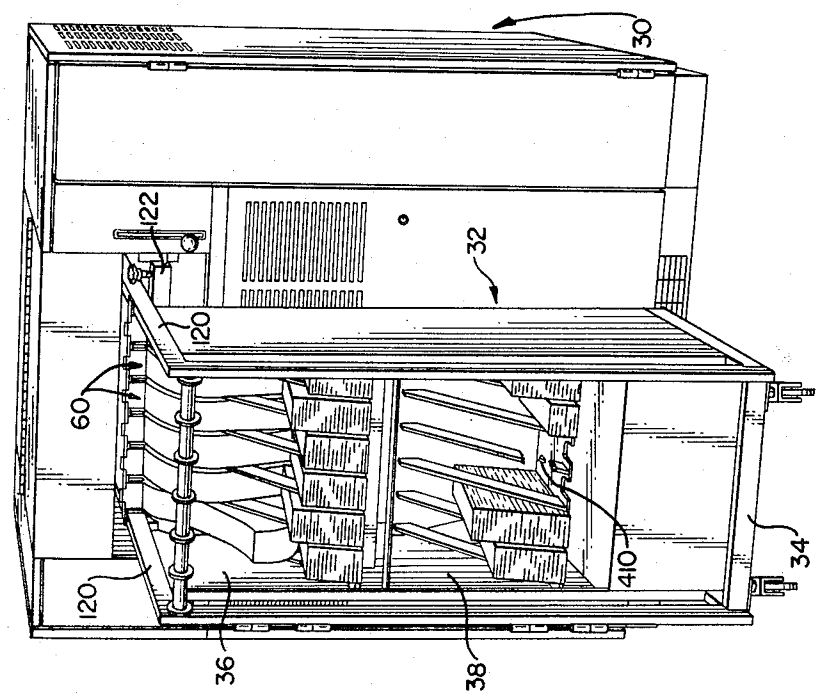
FIG. 2 is a general perspective view of the paper supply means of the multiple paper-feed mechanism and stacker device as it is attached to the input side of the printer.
Figure 1:
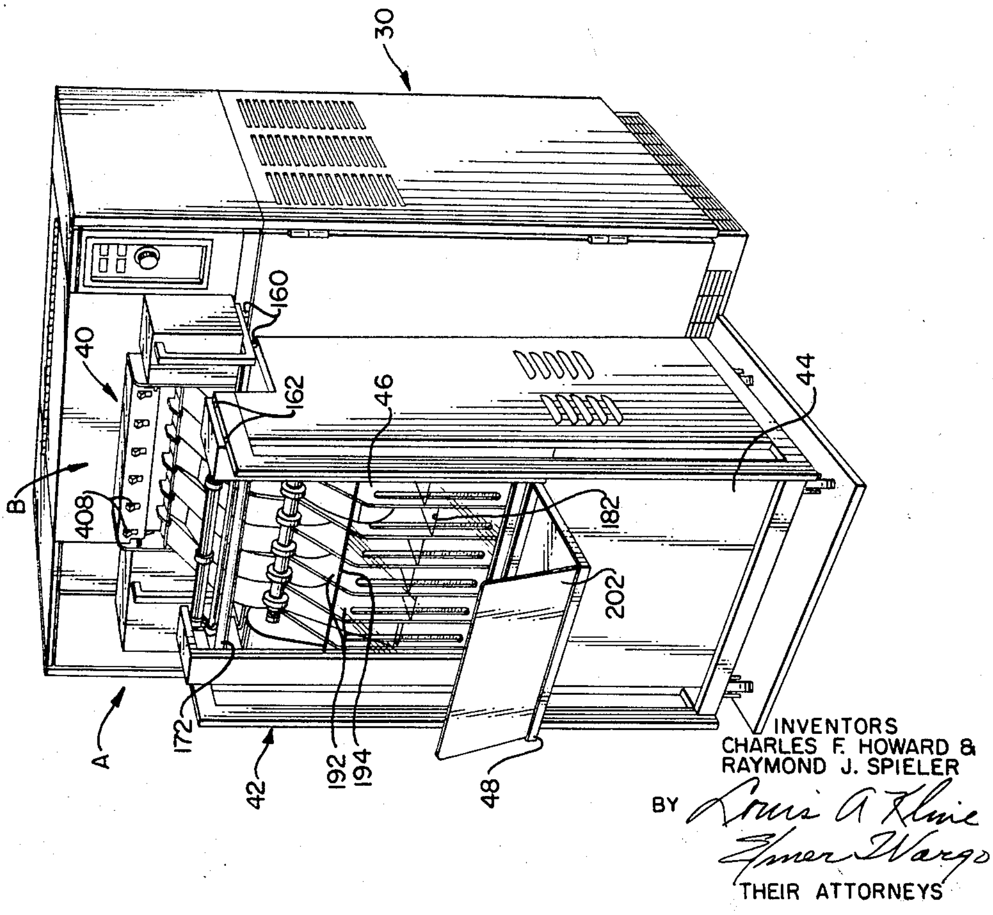
FIG. 1 is a general perspective view of the printed forms receptacle of the multiple paper-feed mechanism and stacker device of this invention as it is attached to the output side of the printer from which the printed forms emerge.

FIGS. 1 and 2 show, respectively, the output side and the input side of the multiple paper-feed mechanism and stacker device as it is detachably secured to a high-speed printer 30. The paper supply means, designated generally as 32, includes an input wheeled cabinet 34, which is detachably secured to the input side of the printer 30 by means to be described later. The cabinet 34 (FIG. 2) includes upper and lower compartments 36 and 38, respectively, which store the paper strips to be fed into the printer 30. The output side of the device includes a feeding mechanism designated generally as 40, which is detachably secured to the printer and which feeds the paper webs or strips from the paper supply means 32 to the printing station in the printer 30 and then discharges them into the paper receptacle, designated generally as 42 (FIG. 1). The paper receptacle 42 includes an output wheeled cabinet 44, which is also detachably secured to the printer by means to be later described. The cabinet 44 is provided with an upper compartment 46 and a pull-out drawer 48 to receive multiple-part, tape forms.

Figure 3:
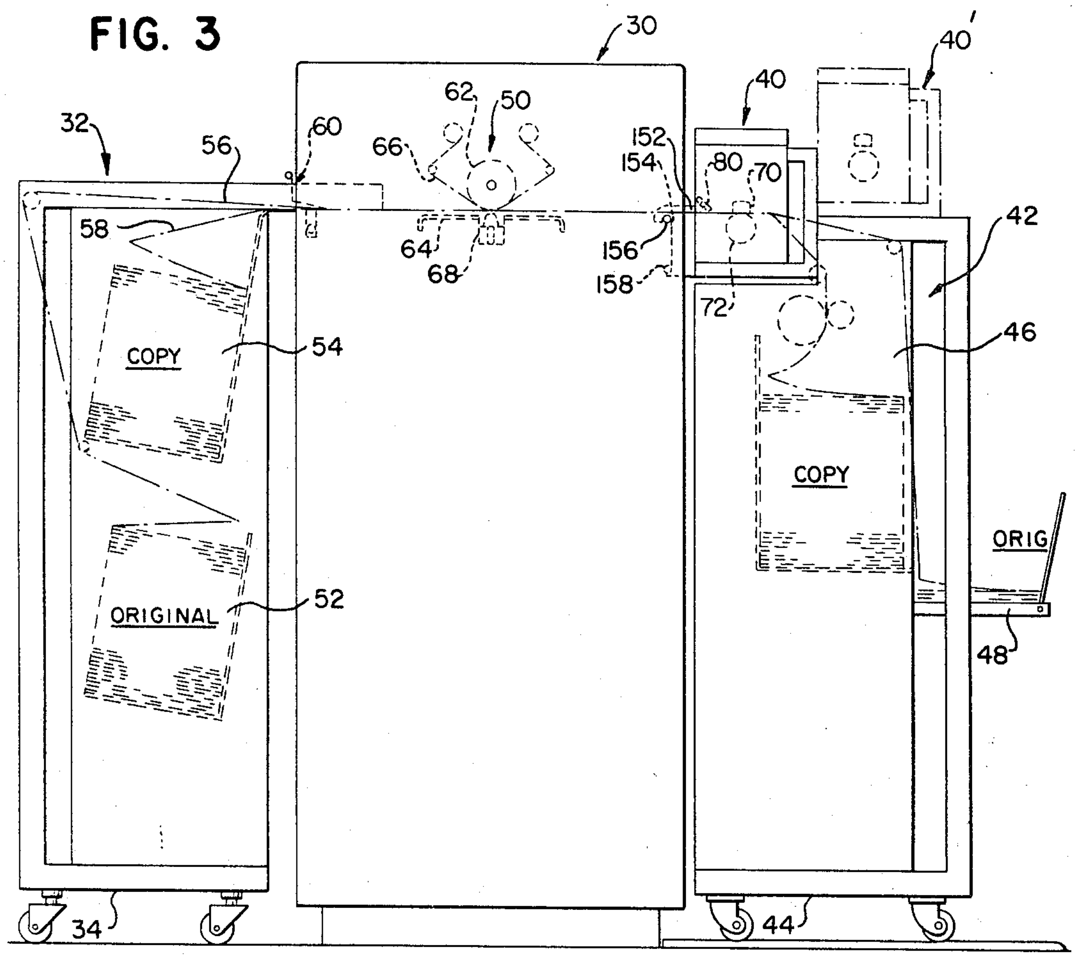
FIG. 3 is a side view in elevation looking in the direction A of FIG. 1 and showing, diagrammatically, the path of the paper forms as they travel from the paper supply means, past the printing station in the printer, and to the printed forms receptacle of this invention.
Figure 4:
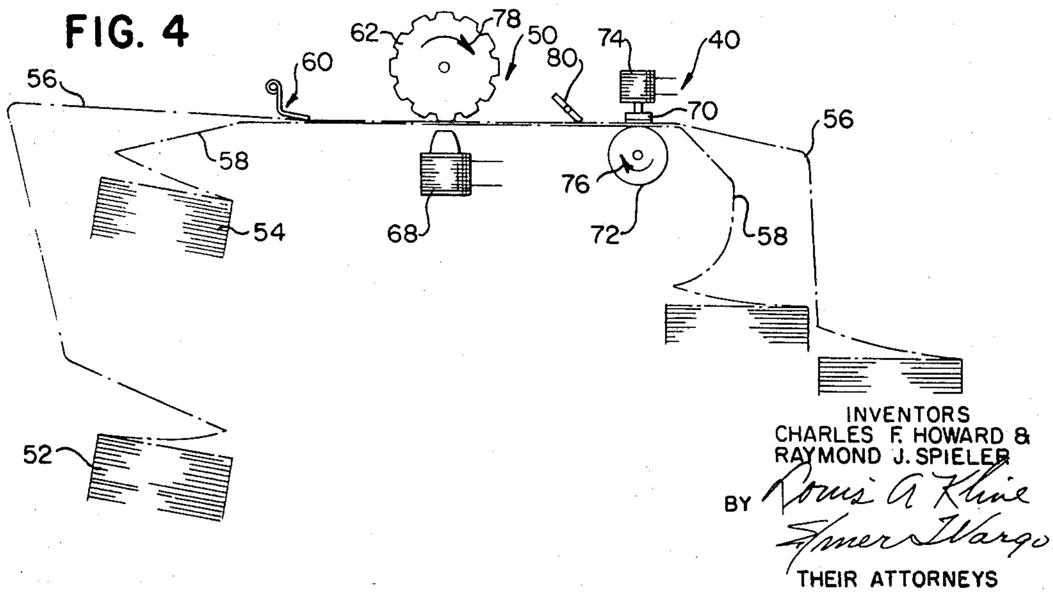
FIG. 4 is an enlarged diagrammatic view of a portion of FIG. 3, showing the means for feeding the paper tapes past the printing station in the printer.

The general method of feeding the paper tapes past the printing station 50 in the printer 30 is shown only generally in FIGS. 3 and 4. For illustration, a two-part form of the kind using chemical coatings to replace the usual carbon sheet between original and copy is shown in use with the original tape positioned in the lower stack 52 and the copy tape positioned in the upper stack 54. The paper tapes are received fan-folded to form convenient stacks in the cabinet 34 and are unfolded as they are withdrawn. The original tape or strip 56 is positioned over the copy tape or strip 58 by known techniques, and the combined multiple-part form engages a drag device 60 associated with the feeding mechanism 40. The details of the drag device 60, which places tension on the strips as they are pulled past the printing station 50, are shown in FIG. 13 and will be later discussed in detail.

The feeding mechanism 40 of this invention is illustrated with a printer 30, which employs a rotating drum 62 (FIGS. 3 and 4) having printing characters on its periphery. The strips 56 and 58, in superimposed relation, pass over a support table 64 (FIG. 3) and under the inking ribbon 66 and the rotating drum 62, where printing hammers 68 are selectively energized by the printer 30 to force the strips 56 and 58 and the ribbon 66 against selected characters on the rotating drum 62 to effect the desired printing. Located downstream from the printing station 30 in the direction of travel of the strips 56 and 58 is the feeding mechanism 40, which is composed of a plurality of pairs of feeding members. Each pair of feeding members includes a shoe member 70 and a roller member 72, between which the strips are positioned. There is one such pair of feeding members for each feeding station in the printer, and, in the embodiment shown in FIG. 1, there are six such feeding stations. When the strips are not to be fed, they do not operatively engage the spaced respective shoe and roller 70 and 72; however, when they are to be fed, the printer 30 issues a signal to rotate the roller 72 and to release the respective solenoid 74 to pinch the strips 56 and 58 between the shoe 70 and the roller 72. The surface of the shoe 70 which engages the strips of paper being fed is smooth, and, as the roller 72, which has an elastomer surface 100 thereon to enhance frictional engagement with the strip 58, turns clockwise, as shown by the arrow 76 (FIG. 4), it moves the strips over the smooth surface of the shoe and thereby feeds the strips past the printing station 50. Frictional engagement between the abutting faces of the strips 56 and 58 is sufficient to keep them moving together without appreciable slippage. Because the drum 62 rotates clockwise, as shown by the arrow 78, it opposes the feeding motion of the feeding members; therefore, anti-back-up means 80 (shown in more detail in FIGS. 5 and 7) are provided to prevent the rotating drum from dragging the strips towards the paper supply means, which would cause defective printing. The roller 72 is intermittently driven in timed relationship with the printing station 50, and the printed strips 56 and 58 which emerge from the feeding mechanism 40 are separated and collected at the receptacle 42, where the original strip 56 is collected at the pull-out drawer 48, and the copy strip 58 is collected at the upper compartment 46 (FIG. 3). The various controls, circuits, and detailed descriptions of the various components of the feeding mechanism 40 will be discussed in detail hereinafter.

Figure 6:
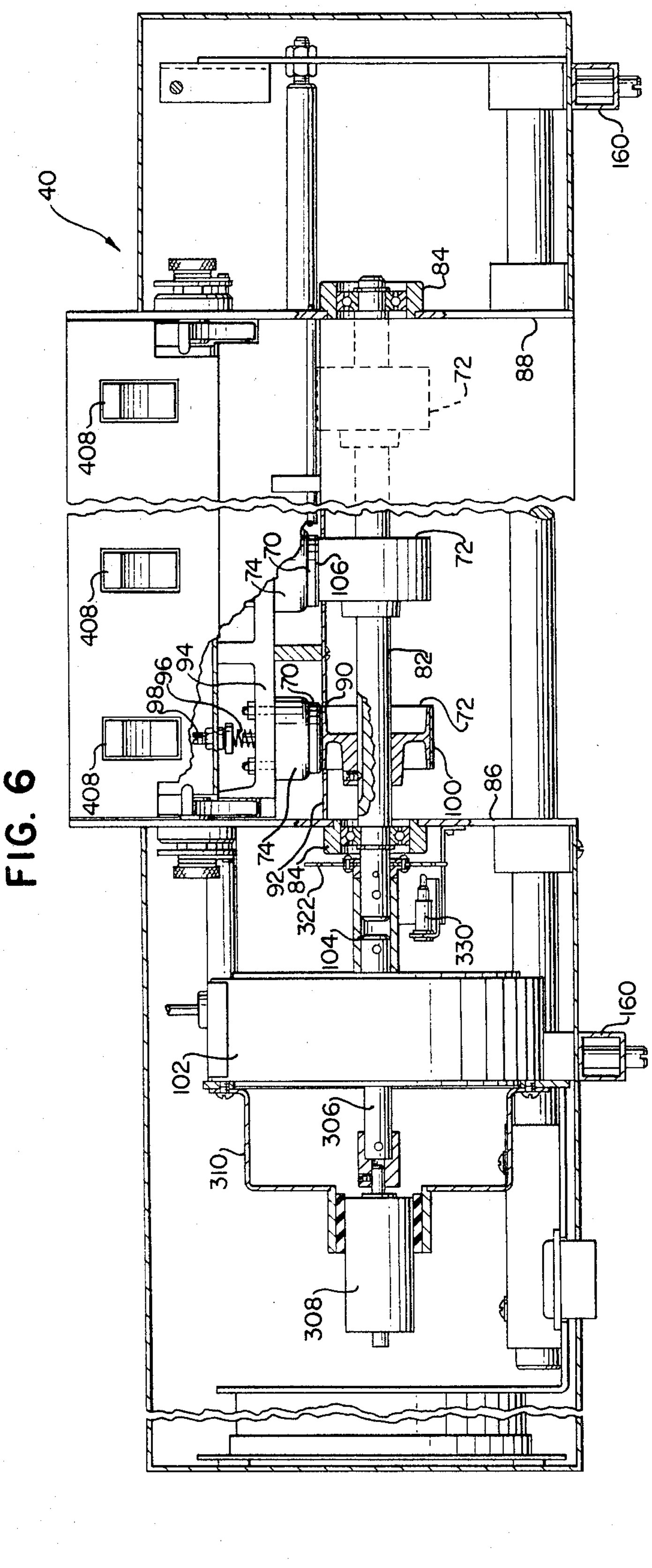
FIG. 6 is a side view in elevation of the portion of the feed mechanism shown in FIG. 5.

The mechanical aspects of the feeding mechanism 40 are best shown in FIGS. 5 and 6, in which only a few of the feeding stations are shown to simplify the illustration thereof. As mentioned earlier, each feeding station for feeding a strip of paper includes a shoe 70 and a roller 72, which are placed in a spaced opposed relation. All the rollers 72 are positioned in spaced parallel relation on the roller shaft 82 and are fixed to rotate therewith. The shaft 82 is rotatably mounted in bearings 84, which are secured to frame members 86 and 88, which are part of the feeding mechanism 40. The peripheries of the rollers 72 pass through suitable slotted openings 90 in a table 92, over which the paper forms are fed. Each shoe 70 is reciprocably mounted in its respective solenoid 74, which is secured to a support member 94. Each shoe 70 is movable between a first position (in which it is spaced from the periphery of its respective roller 72, so that the paper strips to be fed are out of operative engagement with the pertaining roller and shoe) and a second position (in which the shoe 70 is urged against its respective roller by a compression spring 96 to pinch the pertaining paper strips therebetween). When the solenoid 74 is energized, the respective shoe 70 is withdrawn upwardly (as viewed in FIG. 6) away from its respective roller to said first position, and, when the solenoid 74 is deenergized, its spring 96 urges the respective shoe 70 downwardly to said second position. The degree of compression of the spring 96 against the shoe 70 can be controlled and varied by the screw 98, so as to maintain a controlled pressure on the respective roller 72 when the pertaining paper strip is to be fed.

In the embodiment shown, the feeding mechanism 40 enables the printer 30 to print in any two of the six listing positions shown (FIG. 1), each of the six listing stations being twenty-two print columns wide, so that listing is performed at a maximum of forty-four columns at rates up to approximately two thousand numeric lines per minute. The strips of paper being fed are free of sprocket driving holes and may be made from paper stock, card stock, embossed paper, punched card stock, Multilith masters, and the like. When the particular shoe 70 is moved toward its respective roller 72 for a print cycle, the double strip positioned therebetween is pressed against the elastomer surface 100 (FIG. 6) on the roller 72, and a motor 102 is energized intermittently to incrementally rotate the roller shaft 82 via a coupling 104. In rotating, the surface 100 on the roller 72 engages the double strip between its lateral edges and slides it over the smooth surface 106 (FIG 6) of the shoe 70 and thereby incrementally feeds the strip of paper one printing line. The drag device 60 (FIG. 4) keeps the double strip taut and decelerates it, so that it will be stationary when the printing hammers 68 (FIG. 4) engage it to effect the printing thereon. This feeding technique has proved to be very effective in obtaining equally spaced lines of printing.

In the illustrated embodiment, a surface 106 on the shoe 70 is provided with a layer of nickel approximately 0.001 inch thick, which layer is buffed and has a layer of chromium applied thereover by known chromium flashing techniques. A non-stick plastic such as tetrafluoroethylene may also be used for the surface 106; however, the life of the nickel-chrome layer mentioned is greater than that of the named plastic.

The drag device 60 mentioned in the previous paragraph is shown in more detail in FIG. 13. When only one strip of paper is to be fed, it passes in the direction of the arrow C between a plate 108 (which is pivotally mounted at one side of a rod 110) and an entry table 112, which is a part of the paper supply means 32. When a two-part form is to be printed, the second strip of paper to be fed to the printing station passes in the direction of the arrow D between a plate 114 and the plate 108. The plate 114 and a handle plate 116 are secured together by a U-shaped bracket, whose legs are apertured and pivotally mounted on a rod 118. Both rods 110 and 118 are secured in tubular rectangular supports 120 (FIG. 11), which are positioned in spaced parallel relationship, as shown in FIG. 2, and are secured to the crosspiece 122 by fasteners 124 (FIG. 11). Tension or drag on the paper strips passing under the drag device 60 is provided by a tension spring 126, which rotates the plates 114 and 116 clockwise (as viewed in FIG. 13) to force the right-hand ends of the plates 108 and 114 towards the entry table 112.

The crosspiece 122, mentioned in the previous paragraph, provides the means for accurately positioning and detachably securing the paper supply means 32 to the printer 30. The left end of the crosspiece 122, as viewed in FIG. 2 and shown in FIG. 12, is provided with an adjustable screw 128 for centering the groups of columns of print on the respective strips. The screw 128 fits into a socket 130 (FIG. 12), which is secured to a wall 132 of the printer 30. The right side of the crosspiece 122 is provided with a pin 134 (FIG. 11), which is slidably mounted therein. A knob 136 is turned to advance a conical point 138 into a conical opening 140 in a pin 134 to withdraw the pin into the crosspiece 122 and out of a socket 144, which is secured to the right side 146 of the printer 30. By withdrawing the pin 134, the paper supply means 32 may be detached from the printer 30. To attach the paper supply means 32, the screw 128 is first placed in the socket 130 (FIG. 12), and the pin 134 is aligned with the hole in the socket 144 (FIG. 11). The knob 136 is then turned to withdraw the point 138 from the conical opening 140, enabling the spring 142 to push the pin 140 outwardly of the crosspiece 122 and into the socket 144 to secure the paper supply means 32 to the printer 30. A pin 148, fitting into an axially-aligned groove 150 on the pin 134, prevents rotation of the pin 134 and limits the axial movement of the pin 134 in and out of the crosspiece 122.

The means for securing the feeding mechanism 40 to the printer is shown principally in FIG. 3. The feeding mechanism 40 has a pair of spaced, opposed plates 152 (only one shown in FIG. 3), each plate 152 having a notch 154, which fits over a pin 156 secured to the side walls of the printer. After the plates 152 are positioned on their respective pins 156, the mechanism 40 is rotated clockwise (as viewed in FIG. 3) until the lower ends of the plates 152 abut against their respective lower pins 158 on the printer 30. The feed mechanism 40 is provided with projections 160 (FIG. 1) depending from its lower side, which projections fit into complementary openings 162 in the paper receptacle 42 to secure the mechanism 40 thereto, as shown by the dashed outline 40' (FIG. 3) when the feed mechanism 40 is not in use. When the feed mechanism is in use, the output wheeled cabinet 44 is simply pushed against the printer, so that the compartments 46 (FIG. 1) for the individual strips are aligned with the respective feeding stations on the feeding mechanism 40 when it is detachably secured to the printer 30, as previously explained.

The details of the paper receptacle 42 for receiving the printed strips from the printing station 50 are shown principally in FIG. 14. As the printed paper strips 56 and 58 emerge from the feeding stations (only the roller 72 being shown), the original strip 56 passes over, and the copy strip 58 passes under, the electrostatic eliminator 166, which is adjustably secured to a rod 168, which in turn is detachably secured to slotted plates 170 on opposed sides of the cabinet 44. The original strip 56 passes over a bar 172 (which is used only when two strips are fed) and is then fan-folded as it drops onto the pull-out drawer 48 to form a stack 174. The copy strip 58 passes over the rounded edge 176 of a lever 178, whose upper end is pivotally mounted on a rod 180, having opposed ends inserted in slots 182 of the respective plates 170. A roller 184 is rotatably mounted on a pin 186 secured to the lever 178 as shown. The roller 184 is urged by gravity (in pendulum fashion) towards the periphery of a roller 188, which is rotated in the direction D by a shaft 190 to keep a slight tension on the strip 58 as it emerges from its feed station. The strip 58 then falls downwardly and is fan-folded to form a stack 182 between compartment dividers 192 (FIG. 1). The shaft 190 is rotated by a conventional motor (not shown).

When the stacks 182 are to be removed from the compartment 46, the transparent door 194 (FIGS. 1 and 14) is pivoted away from the stacks. The lower end of the door 194 is provided with a bracket 196 (FIG. 14), which is pivotally mounted on a pin 198. A spring 200 returns the door 194 to the position shown in FIG. 14. The stack 174 may be easily removed from the pull-out drawer 48, which does not contain dividers. When only a one-part strip is being run, only the compartment 46 (FIG. 1) would be used, and a plate 202 on the unused pull-out drawer 48 (FIG. 14) would be folded into the drawer and the drawer pushed in channel 204. A screw 206 limits the outward movement of the drawer 48 in the channel 204.

Figure 10:
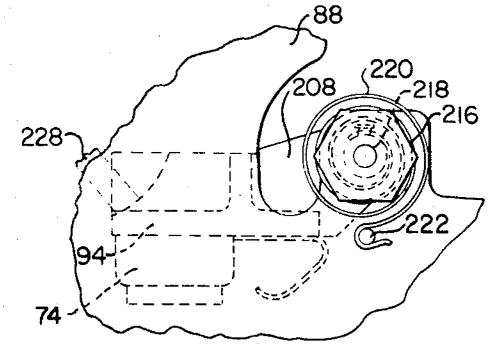
FIG. 10 is a partial view taken along the line 10—10 of FIG. 5, showing a counterbalance spring for moving the solenoid means away from the respective roller (not shown) to facilitate the insertion of the paper tape therebetween.

To facilitate the insertion of paper strips to be fed into the individual feed stations, the following construction is used. The individual solenoids 74 for each of the feed stations are secured to a support member 94 (FIGS. 6 to 8), as previously mentioned, and the support member 94 has plates 207 and 208 secured to opposed ends thereof, as shown in FIG. 5. The plate 207 (FIG. 5) is pivotally mounted on a screw 210, and the other plate, 208, is fixed to rotate with a screw 212. The screw 212 has opposed flat areas 214, which fit into a complementary opening in the plate 208 (FIG. 5) to rotate it. The plate 208 also fits against a shoulder on the screw 212 to provide clearance between it and the frame member 88. A nut 216, having a sleeve portion 218 (FIG. 5) thereon, slidably fits over the right-most end of the screw 212, as viewed in FIG. 5. A coiled band spring 220 has one end secured to the sleeve portion 218, and the other end is held stationary by a pin 222 (FIG. 10), which is secured to the plate 88. The nut 216 can be rotated on the screw 212 to vary the torsion on the spring 220, and, when the torsion is obtained, a set screw 224 (FIG. 5) fixed the nut 216 and the sleeve portion 218 to the screw 212.

Figure 7:
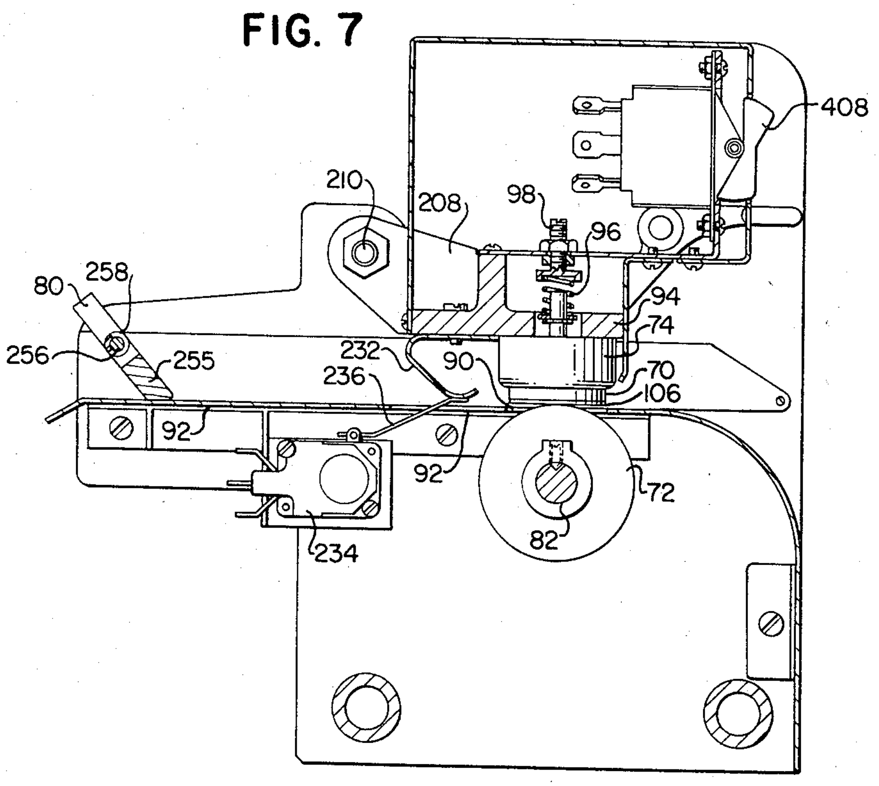
FIG. 7 is a cross-sectional view taken along the line 7—7 of FIG. 5, showing more details of the individual feed stations.
Figure 8:
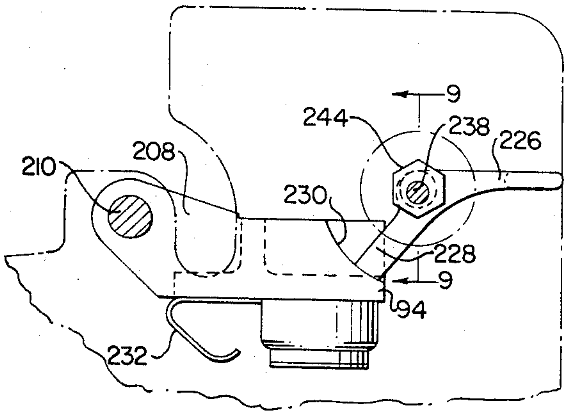
FIG. 8 is a modified, cross-sectional view taken along the line 8—8 of FIG. 5, showing the lever means enabling the solenoid means to be moved towards the respective roller after the insertion of the paper tape therebetween.

With sufficient torsion on the spring 220, the support member 94 and the solenoids 74 carried thereby will be rotated away from the roller 72 in a counterclockwise direction as viewed in FIG. 8 when a cam lever 226 is rotated counterclockwise to withdraw the leg 228 from a camming groove 230 located on the support member 94. When the solenoids 74 are rotated away from the roller 72, the paper strips can be easily inserted therebetween. After the strips are inserted, the support member 94. When the solenoids 74 are rotated away from the and the lever 226 is rotated clockwise to bring the leg 228 into engagement with the cam groove 230 and thereby hold the solenoids in position over their respective rollers 72. The underside of the support member 94 is provided with a leaf spring 232 for each feeding station to urge the respective paper strip (not shown) towards the respective roller 72. A snap-action switch 234 (FIG. 7) with an actuator arm 236 to engage the paper strip is provided for each feeding station, and, when any one of the feeding stations runs out of paper, the pertaining snap-action switch 234 is actuated, and the printing operations are conventionally stopped until the paper supply is replenished.

Figure 9:
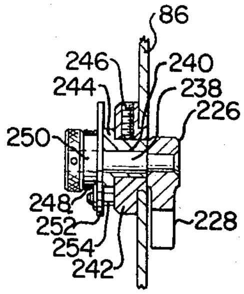
FIG. 9 is a cross-sectional view of the lever means shown in FIG. 8 and is taken along the line 9—9 thereof.

To provide some adjustment between the solenoids 74 and their respective rollers 72, the lever 226 is adjustably mounted as shown in FIG. 9. The lever 226 is fixed to rotate with the shaft 238, which is rotatably mounted in an eccentrically-located hole in a bushing 240, which is rotatably mounted in a collar 242, which in turn is fixed to the frame member 86. The bushing 240 has, at one end thereof, a hex 244, by which it is rotated in the collar 242. With the leg 228 positioned in the cam groove 230, the hex 244 is rotated to obtain the leg adjustment necessary to provide the proper spacing between the solenoids 74 and their respective rollers 72. Once adjusted for a particular feed station, the bushing 240 is fixed to the collar 242 by a set screw 246.

The lever 226 is urged counterclockwise, as viewed in FIG. 8, by a spring 248 (FIG. 9), so as to enable the leg 228 to engage the cam groove 230. The spring 248 is mounted on a bushing 250 rotatable on the shaft 238 and is fixed at one end to a disc 252 (FIG. 15), which also is rotatable on the shaft 238. The other end of the spring 248 is fixed to a pin 254, which passes through a cut-out portion of the disc 252 and is secured to the collar 242 (FIG. 9). The pin 254 limits the extent of motion of the disc 252 in both rotating directions.

The anti-back-up means 80, shown in FIGS. 5 and 7, prevents the rotation of the rotating drum 62 (FIG. 4) from pulling the paper strips in opposition to the feeding mechanism 40. The anti-back-up means 80 for each feeding station includes a plate 255, which is pivotally mounted on a rod 256, and the plate 255 is urged clockwise (as viewed in FIG. 7), by a spring 258, towards the table 92. The lower end of each plate 255 (as viewed in FIG. 7) is provided with a rubber edge (not shown), which engages the strips of paper as they pass thereunder. The tension on the strips may be varied by twisting the spring 258 on the rod 256 and then locking one end of the spring in a locking collar 260 (FIG. 5), while the other end is secured to the plate 255. All such means 80 are mounted on the shaft 256, which is locked in position relative to the frame member 86 by a locking collar 262.

One of the problems encountered in the design of the present feeding mechanism 40 related to the mechanism for incrementally rotating the shaft 82, to which the rollers 72 (FIG. 6) are secured, at rates up to approximately two thousand feed operations per minute. The usual rotational clutch, connecting a drive motor with a driven shaft, would have contained too much inertia and frictional torque to be effective at such high stepping rates. The printed circuit motor, with its low inertia and frictional torque, provided the basis for a drive mechanism to rotate the shaft 82 at the high rates required.

The printed circuit motor 102 (FIG. 6) is operatively connected to the shaft 82 by the coupling 104 and is stepped along under the control of the circuitry shown in block form in FIG. 17. The printer 30, with which the feeding mechanism is used, generates a positive motor start pulse or feed signal, designated in FIG. 17 by the reference character 264, of about eight milliseconds duration (repeated every thirty milliseconds) to initiate the feeding operation. The pulse 264 is fed to a conventional dual flip-flop driver 266, which inverts the signal and provides a negative pulse 268 on the output lines 270 and 272. The output line 270 is connected to the input terminal 274 of a conventional, transistorized flip-flop 276, which is operated by the negative pulse 268 to produce a −6.8-volt signal at its output terminal 278. The line 280, which is connected to the terminal 278, delivers the −6.8-volt signal to the input terminal 282 of a conventional bi-directional servo-amplifier 284. The output terminal 286 of the servo-amplifier 284 is connected to the input terminal 288 of a conventional power amplifier 290 via a line 292, and its output terminal 294 is connected via a line 296 to one lead 298 of the conventional D.C. printed circuit motor 102. The remaining lead 302 of the motor 102 is connected over a resistor 304 to zero volts, or the reference level.

When the printer 30 generates a motor start pulse or feed signal 264 (FIG. 17), it also generates a pulse to the appropriate conventional solenoid drivers (SD1 through SD6) to actuate the pertaining solenoids 74, which, in the embodiment shown, is actually to deenergize them, thereby permitting the compression springs 96 to expand. The shoe members 70 (under the influence of their respective springs 96, FIG. 6) are then urged towards their respective roller members 72 to feed the strip positioned therebetween, as previously explained. Upon the termination of said pulse from the printer 30 to the appropriate solenoid drivers (SD1 through SD6), the pertaining solenoids 74 are energized to withdraw their respective shoes 70 to the first position, as previously explained. The number of strips which can be simultaneously fed is limited by the motor size.

The printed circuit motor 102 is part of a D.C. velocity servomechanism, as shown in FIG. 17. The motor 102 is provided with a second shaft 306 (FIG. 6), to which is attached a D.C. tachometer generator 308, which is used as a generator. The generator 308 is mounted in an insulating frame 310, which is secured to the housing of the motor 102. When the motor start signal (−6.8 volts) is applied to the servo-amplifier 284, both the motor 102 and the generator 308 are at rest. Due to the generator 308 being at rest, there is no counter or opposing voltage across the generator, and, consequently, the start signal (−6.8 volts) is, in essence, a large error or difference signal, which is amplofied by the servo-amplifier 284 and is delivered to the power amplifier 290, where it is further amplified and applied to the motor 102, to cause said motor to rotate the shaft 82 clockwise, as viewed in FIG. 7, and thereby feed the paper strips, as previously mentioned. As soon as the motor 102 begins to rotate, it also rotates the generator 308, and the generator produces a voltage in opposition to the motor start signal, thereby reducing the −6.8-volt signal until the reduced difference signal falls within the acceptance band of the servo-amplifier 282 and the motor stabilizes at a constant velocity in the running condition. When so stabilized, the output voltage of the generator 308 is nearly equal to the input voltage. Under such a stabilized condition, the motor 102 would continue to run at a constant rate and continuously feed or "slew" the paper strips until the −6.8-volt input signal is terminated.

The −6.8-volt input signal to the drive motor 102 is normally terminated after the shaft 82 (FIG. 6) has rotated a certain angular amount to effect the necessary one-line feed of the paper strips. The circuitry to effect the stopping is shown in FIG. 17. The start pulse 268 emerging from the flip-flop driver 266 travels on the line 272 to the input terminal 312 of a conventional, transistorized flip-flop 314 to trigger it and produce a negative signal at its output terminal 316, which is fed to the input terminal 318 of a conventional AND gate 320. The signal at the input terminal 318 remains negative until the flip-flop 314 is reset to produce a positive pulse. The negative signal at the input 318 of the AND gate 320 prevents the flip-flop 276 from being reset, which resetting would stop the motor 102. In order to stop the motor 102, the flip-flop 314 must be reset before the flip-flop 276 is reset. This is necessary to prevent the motor 102 from getting stop and start signals simultaneously, which would incapacitate the motor. Normally on stopping, one of the slits 324 runs past the solar cell 328 by a slight amount. If the slits did not do so on stopping, or if the shaft 82 were reversed slightly during the rest between successive feedings, a stop signal would occur immediately after the start signal was received, thereby resulting in an overprint. The solar cell 326 was added to prevent this.

The flip-flop 314 is reset by the circuitry shown in FIG. 17 and by apparatus including a timing disc 322, shown in FIGS. 5, 6, 15, and 16. The timing disc 322 is rotated by the shaft 82, which also rotates the rollers 72, and consists of thirty-three equal opaque sectors of approximately ten degrees each, which are separated by equal radial slits or transparent sectors 324 (FIG. 15) of approximately one degree each. Associated with the timing disc 322 are two solar cells 326 and 328, which are positioned near the periphery of one side of the disc 322, and two lamps 330 and 332, which are positioned on the opposite side of the disc 322, the lamp 330 being directed at the solar cell 326 (FIG. 16) and the lamp 332 being directed at the solar cell 328. The lamps are energized continuously, and, when one of the slits 324 of the timing disc 322 becomes aligned with the lamp 330 or 332, the light therefrom passes through the slit and energizes its respective solar cell 326 and 328 for about two milliseconds duration until the next succeeding opaque sector 324 of the disc blocks the light. The solar cells 326 and 328 are positioned approximately ninety degrees apart on the periphery of the timing disc 322 and are properly adjuted relative to each other when an output pulse of the solar cell 326 falls midway in time between two consecutive output pulses of the solar cell 328.

In order to stop the motor 102, the solar cell 326 must be energized before the solar cell 328 is energized. Energization of the cell 328 effects the resetting of the flip-flop 276, which changes the negative −6.8-volt run signal at its output terminal 278 to positive output (0 volts). The circuitry for effecting the stopping is shown in FIG. 17. When light from the lamp 330 passes through one of the slits of the timing disc 322 and falls upon the solar cell 326, a signal is produced which is amplified in a conventional solar cell amplifier 334 resulting in a positive signal 336 (0 volts) being delivered to one input terminal 338 of a conventional AND gate 340. The remaining input terminal 342 of the AND gate 340 is connected to a positive source of potential (0 volts) through normally-closed, manually-operated switch means 344, which can be operated to cause constant, uninterrupted feeding of the paper strips. When both input terminals 338 and 342 of the AND gate 340 are positive, a positive signal 346 is transmited from the output terminal 348 of the AND gate 340 and is delivered to the input terminal 350 of a conventional flip-flop driver 352, which inverts the input thereto to produce a negative signal 354 at the output terminal 356. The negative signal 354 is delivered to the input terminal 358 of the flip-flop 314, which is reset to produce a positive signal (0 volts) at the output terminal 316, which positive signal is fed to the input terminal 318 of the AND gate 320.

After the solar cell 326 is energized, as explained in the previous paragraph, the timing disc 322 is further rotated by the motor 102 until one of the slits 324 in the disc 322 becomes aligned with the solar cell 328, enabling it to be energized by its respective lamp 332 until the light from the lamp is blocked out by the next succeeding opaque section, thus producing a signal of about two milliseconds duration, which is amplified in a conventional solar amplifier 360 to produce a positive pulse 362, which is fed into the input terminal 364 of the AND gate 320. With two positive signals being fed to the AND gate 320, a positive pulse 366 is produced at its output terminal 368 and is delivered to the input terminal 370 of a conventional flip-flop driver 372, which inverts the pulse to produce a negative pulse 374 at its output terminal 376. The negative pulse 374 is applied to the input terminal 378 of the flip-flop 276 to reset it, thereby changing the output at the terminal 278, and therefore the input at the terminal 282 of the servo-amplifier 284, from a negative 6.8 volts to a positive 0 volts.

The positive output of 0 volts from the flip-flop 276 is effective to stop the motor 102. As previously explained, the D.C. generator 308 and the motor 102 (FIGS. 6 and 17) are part of a high-performance D.C. velocity servomechanism which is used to incrementally rotate the shaft 82 and the rollers 72 secured thereto. As the motor begins to accelerate after receiving the negative 6.8 volts from the flip-flop 276, it also rotates the generator 308, which produces a positive voltage in opposition to the negative 6.8 volts. The increasing generator voltage soon reaches a level at which it is nearly equal to the negative 6.8 volts, thereby reducing the difference signal mentioned previously to a low level which falls within the acceptance band of the amplifier 284, and the motor stabilizes in the running condition. In actual practice, however, the timing disc 322 and the solar cells 326 and 328 (FIG. 17) are effective to reset their respective flip-flops 314 and 276 before the output from the generator 308 has a chance to fully offset the negative 6.8 volts used to drive the motor 102. The change in the input signal at the terminal 282 of the amplifier 284 results in a net reverse current flowing in the motor until its speed, and the output of the tachometer, are reduced to zero. In the embodiment shown, the time required to stop the motor 102 is about five milliseconds after the resetting of the flip-flop 276.

The current passing through the motor 102 is limited by a conventional current-limiting amplifier 382 (FIG. 17), whose input terminal 384 is connected to the lead 302 of the motor 102, and whose output terminal 386 is connected to the input terminal 388 of the servo-amplifier 284. This amplifier is normally biased off and is turned on only when the motor current causes the voltage across the resistor 304 to exceed a predetermined value, to bias the high-gain, negative- feedback, current-limiting amplifier on.

As previously mentioned, when the printer 30 issues a motor start pulse 264 (FIG. 17), it also issues a pulse to the appropriate solenoid driver (SD1 through SD6). In the embodiment shown, one or two feeding stations may be actuated at one time. For example, if the solenoid drivers SD2 and SD4 are to be actuated, motor start pulses 264 would be routed by the printer 30 to the input line 390 of these respective drivers. Upon receiving the pulse 264, the drivers SD2 and SD4 would deenergize their respective solenoids S2 and S4 by breaking the circuit thereto. Deenergization of the solenoids enables their springs 96 (FIG. 6) to urge the pertaining shoe members 70 against their respective roller members 72, as previously explained. Each solenoid S1 through S5 has one lead 392 connected to its respective solenoid driver, while the other lead is connected in series with a normally-closed, manually-operated, push-button switch S1B through S6B, respectively. The remaining terminal of each of these switches is connected to its respective solenoid driver, as shown in FIG. 17. The switch S1B is operatively connected with the switch S1A, so that both operate together when S1A is actuated, and the switches S2B through S6B are similarly operatively connected to the switches S2A through S6A, respectively.

The switches S1A through S6A, with their related switches S1B through S6B, respectively, manually control the continuous, uninterrupted feeding of the paper strips in the feed mechanism 40. The switches S1A through S6A are normally closed and have the center pole of each switch connected to a common conductor 394, which is connected to a 0-volt potential. When in the position shown in FIG. 17, each first pole of switch S1A through S6A is connected to a common conductor 396 through a diode 398, and the conductor 396 is connected to the input terminal 342 of the AND gate 340. In the position shown in FIG. 17, the switches S1A through S6A are effective to apply a positive 0-volt signal to the AND gate 340 to condition it for resetting the flip-flop 314, as previously explained, and, when the positive pulse from the solar amplifier 334 arrives at the input terminal 338, the flip-flop will be subsequently reset to effect a stopping of the motor 102. When any one of the switches S1A through S6A is actuated to continuously feed a particular strip of paper, the center pole of the switch is moved from the position shown in FIG. 17 to a second position, in which it engages its second respective pole, which is connected to a common conductor 400, thereby connecting the positive 0-volt potential with the input terminals 402 and 404 of the flip-flops 314 and 276, respectively. Upon receiving these positive signals (0 volts), both flip-flops 314 and 276 will be prevented from resetting, and the motor 102 will continue to run to effect the desired slewing. Generally, the switches S1A through S6A are actuated only one at a time to effect slewing of a particular one of six strips of paper fed by the feed mechanism 40.

To further prevent the timing disc 322 (FIG. 17) and the related solar cells 326 and 328 from effecting a stopping of the motor 102 while any one of the switches S1A through S6A is actuated, it is necessary to keep at least one of the inputs to the AND gate 340 negative. The input terminal 318 of the other AND gate 320 is kept negative until the flip-flop 314 is reset. To keep the input terminal 342 of the AND gate 340 negative, so that the flip-flop 314 cannot be reset, a switch 406 (FIG. 17) is provided, which is operatively connected with the switch means 344, so that, whenever any one of the switches S1A through S6A is actuated to slew paper, the switch 406 will be actuated also, and its movable arm, which is connected to a negative 6.8-volt potential, will be moved from the stop 408 to the terminal 410, thereby connecting the negative 6.8-volt potential to the conductor 412, which is connected to the input terminal 342. With the input terminal 342 of the AND gate 340 kept negative, the flip-flop 314 is prevented from resetting, and consequently the motor 102 will continue to run and slew paper until the switch 344 is released.

The diodes 398 (associated with the switch 344, as shown in FIG. 17) are kept in reverse bias by the −6.8 volts from the terminal 410 of the switch 406 to prevent the −6.8 volts from being shorted by the 0 volts received from the group of switches S1A through S6A, and thereby enable the −6.8 volts to be applied to the input terminal 342 of the AND gate 340.

Instead of using one switch 406 which is operatively connected with the switches S1A through S6A, a triple-pole, double-throw switch may be provided for each feeding station. For example, switch S1A, S1B, and a switch similar to the switch 406 would all be actuated from one push button 408, as shown in FIG. 1, to prevent a stopping of the motor 102. When the push button 408 is released, the timing disc 322 and the related solar cells

326 and 328 will effect a stopping of the motor 102, as previously explained.

If one or both of the lamps 330, 332 burns out or fails to light, the paper strips will slew continuously until the defective lamp is replaced. The input wheeled cabinet 34 is provided with an out-of-paper switch 410 (FIG. 2), which stops the printer 30 until the paper supply is replenished. The switch 236 (FIG. 7), which detects broken paper forms, is wired in series with the switch 410 to also give a usual visual indication on the printer 30.

The feeding mechanism 40 has its power supply (not shown) housed in the cabinet 44; however, the mechanism depends upon its supply of electricity from the printer itself and its supply of electricity is obtained via conventional, detachable connections (not shown).

What is claimed is:

1. An apparatus for incrementally feeding a continuous web along the direction of its length, comprising:

frame means;

roller means rotatably mounted in said frame means;

motor means to rotate said roller means;

shoe means reciprocably mounted in said frame means and movable between first and second positions relative to said roller means; and drive means for moving said shoe means between said first and second positions;

said shoe means having a generally flat surface adapted to engage the periphery of said roller means;

said shoe means and roller means being spaced apart when in said first position to receive said web therebetween, and being urged together when in said second position so as to squeeze said web between said periphery and said flat surface;

control means operative in response to a feed signal and adapted to actuate said motor means and said drive means so as to move said shoe means to said second position, enabling the periphery of said roller means to engage said web and slide it over said flat surface, thereby feeding said web in the direction of its length;

and motor-stopping means operatively connected with said motor means and adapted to stop the rotation of said roller means after a predetermined angular rotation thereof, said drive means being adapted to return said shoe means to said first position upon the cessation of its associated feed signal.

2. The apparatus as claimed in claim 1 further comprising selectively operable switch means adapted when actuated to disable said stopping means enabling said motor means to rotate said roller means continuously until said switch means is deactuated.

3. A feeding mechanism for feeding a continuous record strip in a direction along its length to a station in a utilizing device and comprising:

frame means for mounting said feeding mechanism in fixed relation to said station;

a rotatable member mounted in said frame means downstream of said station along the direction of travel of said strip past said station, and having a periphery adapted to engage said record strip;

a shoe member reciprocably mounted in said frame means, and drive means for reciprocating said shoe member between first and second positions therein relative to said rotatable member;

said shoe member having a smooth surface portion in opposed relation to said rotatable member with said surface portion being spaced from said rotatable member when said shoe member is in said first position to receive said record strip therebetween, and with said surface portion forcing said record strip against said rotatable member when said shoe member is in said second position;

a motor operatively connected to said rotatable member to rotate it;

starting means operative in response to a periodically recurring feed signal and adapted to actuate said motor and said drive means so as to move said shoe member from said first position to said second position and hold it thereat for the duration of said feed signal enabling the periphery of said rotatable member to engage said strip and slide it against said surface portion upon the rotation of said periphery, thereby incrementally feeding said strip a fixed amount relative to said station while said shoe member is in said second position;

and stopping means operatively connected with said motor and said starting means and adapted to stop the rotation of said motor after a predetermined angular rotation of said rotatable motor, said drive means being adapted to return said shoe means to said first position upon the cessation of its associated feed signal.

4. The feeding mechanism as claimed in claim 3 further comprising adjustable drag means positioned upstream of said station and secured to said frame means for providing tension on said strip as it is fed to said station by said rotatable member and said shoe member.

5. The feeding mechanism as claimed in claim 4 in which said utilizing device is a printer of the variety having a rotating drum with printing characters on the periphery thereof and having printing hammers adapted to be selectively energized to force the strip to be printed against selected ones of said characters to effect the printing thereof;

said drum having a rotation which tends to act in opposition to the said direction of feeding of said strip when said hammers are energized to force said strip against said drum;

and adjustable means positioned between said station and said rotatable member enabling said strip to be moved only in a downstream direction from said station.

6. The feeding mechanism as claimed in claim 5 in which said smooth surface portion of said shoe member is covered with a coating having a low coefficient of friction and the periphery of said rotatable member is covered with a layer of resilient material; said feeding mechanism further comprising means for adjustably spacing said shoe member from said rotatable member when in said first position.

7. The feeding mechanism as claimed in claim 5 in which said starting means includes:

servo-amplifier means operatively connected to said motor;

and switching means actuated by said feed signal to deliver a first signal to said servo-amplifier means so as to rotate said motor for feeding said strip;

said stopping means including:

photo-responsive means operatively associated with said rotatable member and adapted to generate a stop signal after a predetermined angular rotation of said rotatable member;

D.C. generator means driven by said motor and having an output operatively connected with said servo-amplifier means;

said stop signal being effective to actuate said switching means to cut off said first signal; enabling the output of said D.C. generator to oppose the rotation of said motor and thereby effectively stop the rotation thereof.

8. The feeding mechanism as claimed in claim 7 in which said photo-responsive means includes:

a timing disc fixed to rotate with said rotatable member and having radial slits equally spaced around the perimeter thereof;

and at least one light source member and light-responsive member positioned on opposite sides of said timing disc so that said light-responsive member is energized to produce said stop signal by light passing through one of said radial slits as said timing disc is rotated.

9. The feeding mechanism as claimed in claim 7 in which said photo-responsive means includes:

a timing disc fixed to rotate with said rotatable member and having a radial slits equally spaced around the perimeter thereof;

two pairs of photo-responsive members with each said pair including a light source member and a light-responsive member positioned on opposite sides of said timing disc so that each said light-responsive member is energized by its respective light source member by light passing through said slits as said timing disc is rotated;

said pairs of photo-responsive members being positioned relative to each other and said timing disc so that one of said light-responsive members is energized midway between two successive energizations of the other light-responsive member;

and circuit means interconnecting said light-responsive members and said switching means and including gate means adapted to permit said stop signal to actuate said switch means to cut off said signal only when said photo-responsive members are energized in a predetermined sequence.

10. In combination, a printer and a lister device detachably secured to said printer; said printer having a printing station, an input side, and an output side;

said lister device comprising:

paper supply means detachably secured to said printer on said input side and adapted to hold a plurality of strips to be fed to said printer;

a feeding mechanism adapted to feed said strips from said paper supply means to said printing station;

and receptacle means adapted to receive the printed strips as they emerge from said printing station;

said feeding mechanism comprising:

frame means for detachably mounting said feeding mechanism in fixed relation to said printing station;

a plurality of pairs of feeding members including a roller and a shoe member for each said roller, with each said shoe member being positioned in opposed relation with its respective said roller so as to receive therebetween one of said strips to be fed to said printing station;

a shaft rotatably mounted in said frame means with said rollers of said pairs being positioned in parallel spaced relation on said shaft and being fixed to rotate in unison therewith;

each said shoe member of each said pair having a smooth surface and being reciprocably mounted in said frame means for movement between first and second positions therein so that when any one of said shoe members is in said first position, it is spaced from its respective roller, and when said shoe member is in said second position, said strip is pressed between said smooth surface and the last-named roller;

each said pair of feeding members having first drive means selectively operable in response to a signal from said printer to move the said shoe member thereof from said first position to said second position;

and second drive means operatively connected to said shaft to incrementally rotate said shaft in response to a signal from said printer and thereby rotate all of said rollers in unison, each said pair of feeding members being effective to feed its respective strip when its shoe member is moved to said second position to enable its roller to slidingly move its respective strip over its respective smooth surface and thereby feed said last-named strip in the direction of its length to said printing station, each said pair of feeding members being returned to said first position upon the cessation of its associated said signal.

References Cited

UNITED STATES PATENTS

| | | | |
|---|---|---|---|
| 2,638,821 | 5/1953 | Baumgartner | 226—152 X |
| 2,800,073 | 7/1957 | Block | 101—93 |
| 2,825,559 | 3/1958 | Davidson | 101—93 |
| 2,915,966 | 12/1959 | Jacoby | 101—93 |
| 2,915,967 | 12/1959 | Gehring et al. | 101—93 |

WILLIAM B. PENN, *Primary Examiner.*

U.S. Cl. X.R.

101—66; 197—133; 226—108, 162

U.S. DEPARTMENT OF COMMERCE

PATENT OFFICE

Washington, D.C. 20231

UNITED STATES PATENT OFFICE

CERTIFICATE OF CORRECTION

Patent No. 3,440,955 April 29, 1969

Charles F. Howard et al.

It is certified that error appears in the above identified patent and that said Letters Patent are hereby corrected as shown below:

Column 7, line 10, cancel "When the solenoids 74 are rotated away from the"; same line 10, after "94" insert -- is manually rotated clockwise, as viewed in FIG. 8, --.

Signed and sealed this 14th day of April 1970.

(SEAL)
Attest:

Edward M. Fletcher, Jr.
Attesting Officer

WILLIAM E. SCHUYLER, JR.
Commissioner of Patents